June 15, 1971  G. W. IRWIN  3,585,018
PLUNGER ALIGNING MEANS
Filed March 20, 1969  4 Sheets-Sheet 1

INVENTOR.
GEORGE W. IRWIN
BY
ATTORNEYS

INVENTOR.
GEORGE W. IRWIN
ATTORNEYS

June 15, 1971  G. W. IRWIN  3,585,018
PLUNGER ALIGNING MEANS
Filed March 20, 1969  4 Sheets-Sheet 3
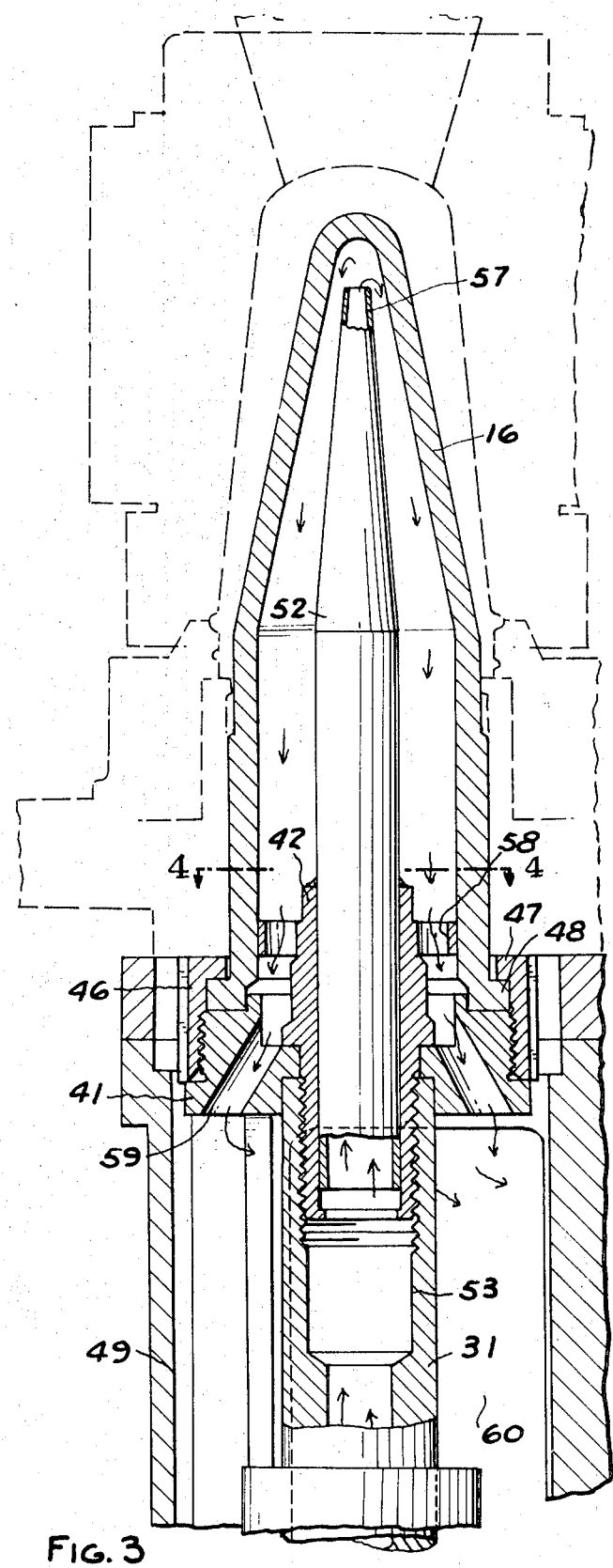
FIG. 3
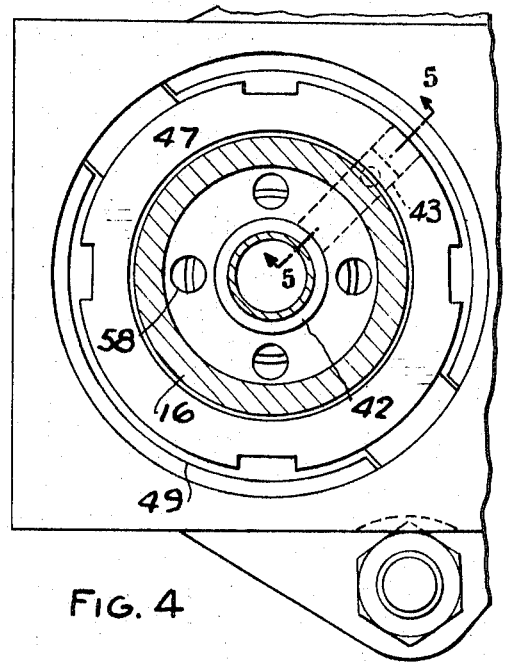
FIG. 4
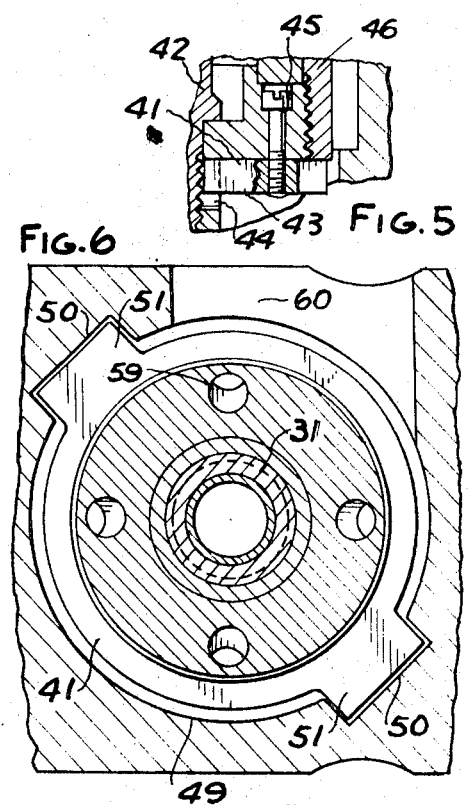
FIG. 5
FIG. 6
INVENTOR.
GEORGE W. IRWIN
BY
ATTORNEYS June 15, 1971    G. W. IRWIN    3,585,018
PLUNGER ALIGNING MEANS
Filed March 20, 1969    4 Sheets-Sheet 4

INVENTOR.
GEORGE W. IRWIN
BY
ATTORNEYS

United States Patent Office 3,585,018
Patented June 15, 1971

3,585,018
PLUNGER ALIGNING MEANS
George W. Irwin, Holland, Ohio, assignor to
Owens-Illinois, Inc.
Filed Mar. 20, 1969, Ser. No. 808,878
Int. Cl. C03b 9/40
U.S. Cl. 65—323    8 Claims

ABSTRACT OF THE DISCLOSURE

A glass forming machine wherein charges of molten glass are fed to parison molds at a parison molding station, formed into parisons by movement of plungers at the parison molding station, and thereafter transferred to a blow molding station. The glass molding machine is adapted for forming at least three charges of glass simultaneosuly.

---

This invention relates to glass forming machines.

In one type of glass forming machine, commonly known as an individual section machine, such as shown in the patent to Ingle 1,911,119, a charge of glass is fed to an open ended parison mold at a parison molding station, formed into a parison at the parison molding station and thereafter transferred by a neck ring by inversion to a blow molding station where the parison is formed into the final article. Where more than one charge is to be formed at a time at the parison molding station, substantial problems may occur with respect to the various forming operations including the movement of plungers to form the parison.

Among the objects of the present invention are to provide a glass forming machine including a novel parison plunger mechanism wherein at least three charges of glass may be formed simultaneously; wherein the parison plunger mechanism can be readily adapted to a conventional machine so that the machine can be converted to single, double or triple parison forming; wherein individual control of each of the plunger operations can be obtained.

SUMMARY OF THE INVENTION

A glass forming machine wherein charges of molten glass are fed to parison molds at a parison molding station, formed into parisons by movement of plungers at the parison molding station, and thereafter transferred to a blow molding station. The glass molding machine is adapted for forming at least three charges of glass simultaneously. The plunger assembly, made in accordance with the invention, comprises at least three cylinders which have plungers at the upper end thereof. Each plunger is guided in its movement and is supplied with cooling fluid.

DESCRIPTION OF THE DRAWINGS

FIG. 3 is a fragmentary part sectional view on an enlarged scale of a portion of the machine shown in FIG. 2.

FIG. 4 is a fragmentary sectional view taken along the line 4—4 in FIG. 3.

FIG. 5 is a fragmentary sectional view taken along the line 5—5 in FIG. 4.

FIG. 6 is a fragmentary sectional view on an enlarged scale taken along the line 6—6 in FIG. 2.

DESCRIPTION

Figure 1:
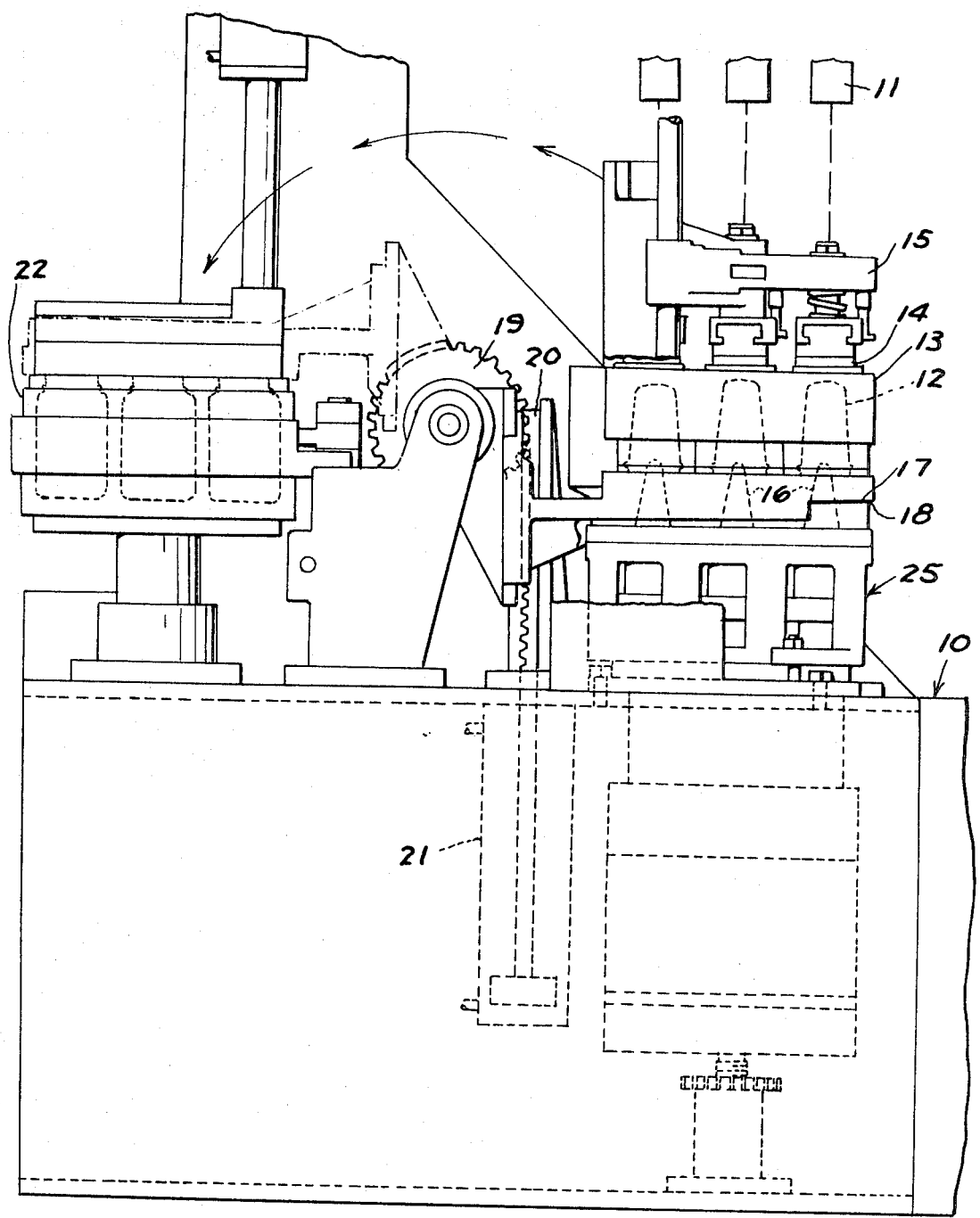
FIG. 1 is a fragmentary elevational view of the glass forming machine embodying the invention.

Referring to FIG. 1, the glass forming machine comprises a base 10 which supports the various mechanisms. Charges of molten glass are delivered from guides 11 to the open upper ends of molds 12 supported on a mold arm 13. The upper ends of the molds are closed by baffles 14 supported on a baffle arm 15 and plungers 16 are moved upwardly to form the glass charges in the molds 12 and aligned neck rings 17. The neck rings 17 are supported on a neck ring supporting arm 18. After the charges of glass are formed into parisons, the mold arm 12 and baffle arm 15 are moved upwardly and laterally to strip the parisons from the molds. Neck ring arm 18 is thus provided by engagement of the gear 19 thereon with the rack 20 of the piston 21 to bring the neck ring to a blow molding station shown on the left in FIG. 1. At this station, blow molds 22 are brought into position and the parisons are formed into the final glass articles. This general arrangement is old in the art as shown in the aforementioned patent to Ingle 1,911,19.

In accordance with the invention, the plungers 16 form part of a parison plunger assembly 25 which is mounted for vertical adjustment with respect to the base 10, as presently described.

Figure 2:
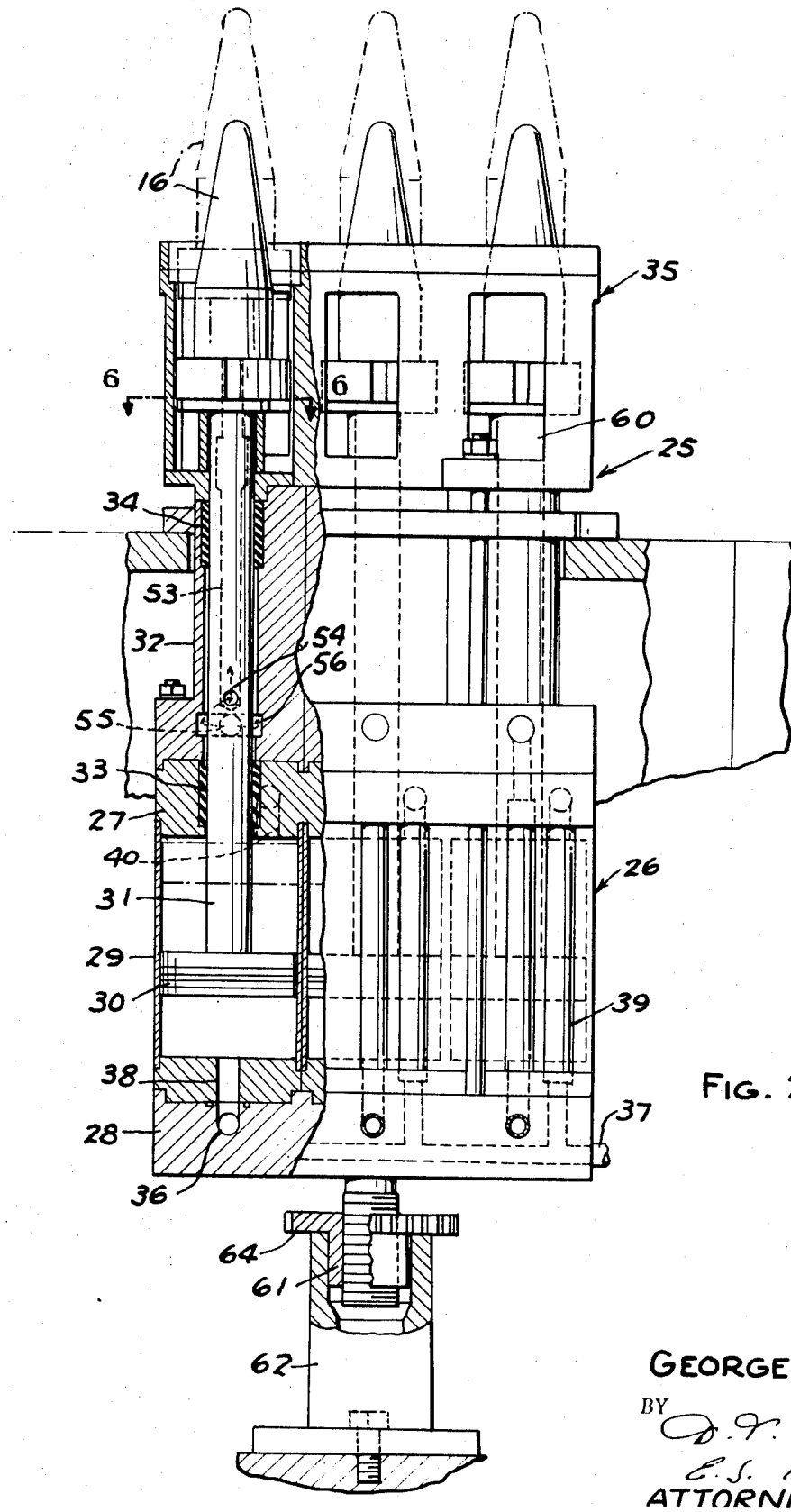
FIG. 2 is a part sectional view on an enlarged scale of a portion of the machine shown in FIG. 1.

Referring to FIG. 2, the plunger assembly 25 comprises a cylinder assembly 26 which in turn includes an upper plate 27, a lower plate 28 and three cylinders 29 extending between the plates. A piston 30 is provided in each cylinder and is fixed to a piston shaft 31 that extends upwardly through a block 32 and has a plunger 16 fixed on the upper end thereof, as presently described. Each piston shaft 31 is guided by longitudinally spaced bearings 33, 34. A receiver or guide block 35 surrounds the upper end of the shaft 31.

The lower plate 28 is provided with fluid inlets 36, 37 which in turn communicate with passages 38 for forcing the pistons upwardly and conduits 39 and passages 40 for forcing the pistons 30 downwardly.

As shown in FIGS. 4, 5 and 6, each piston shaft 31 has a piston head 41 fixed on the upper end thereof by a stud 42 that is threaded into the interior of the upper end of the shaft 31 and engages the head. The head 41 is fixed against rotation by a key 43 that engages a slot 44 in the upper end of the shaft and is fixed to the head 41 by a screw 45. A nut 46 is threaded to the exterior of the head 41 and has a flange 47 engaging a complementary flange 48 on the plunger 16 to hold the plunger in position.

The receiver 35 is provided with three generally cylindrical openings 49 surrounding the upper end of the shafts. Each opening has diametrically opposed vertical slots or grooves 50 (FIG. 6) into which radial projections 51 of the head 41 extend to guide the upper end of the plunger 16 and prevent its rotation.

Means are provided for cooling the interior of each plunger 16 which is hollow and comprises a cooling tip 52 fixed to the upper end of the piston shaft by stud 42 to which the tip 52 is welded. The tip 52 is hollow and communicates with a vertical passage 53 forming a part of each piston shaft 31. As shown in FIG. 2, passage 53 communicates with a lateral opening 54. Cooling fluid is supplied to the block 32 through an inlet 55 to an annular passage 56 and in turn through opening 54 of the piston shaft 31 and passes upwardly through the passage 53 of the shaft and in turn to the cooling tip 52 which has an opening 57 in the upper end thereof. The cooling fluid follows the direction of the arrows as shown in FIG. 2 and passes downwardly through relatively unrestricted openings 58 in the lower end of the plunger and through exhaust passages 59 which are also relatively unrestricted in the head 41. The sides of the guide block 35 have openings 60 so that the cooling fluid freely passes to the atmosphere.

Figure 7:
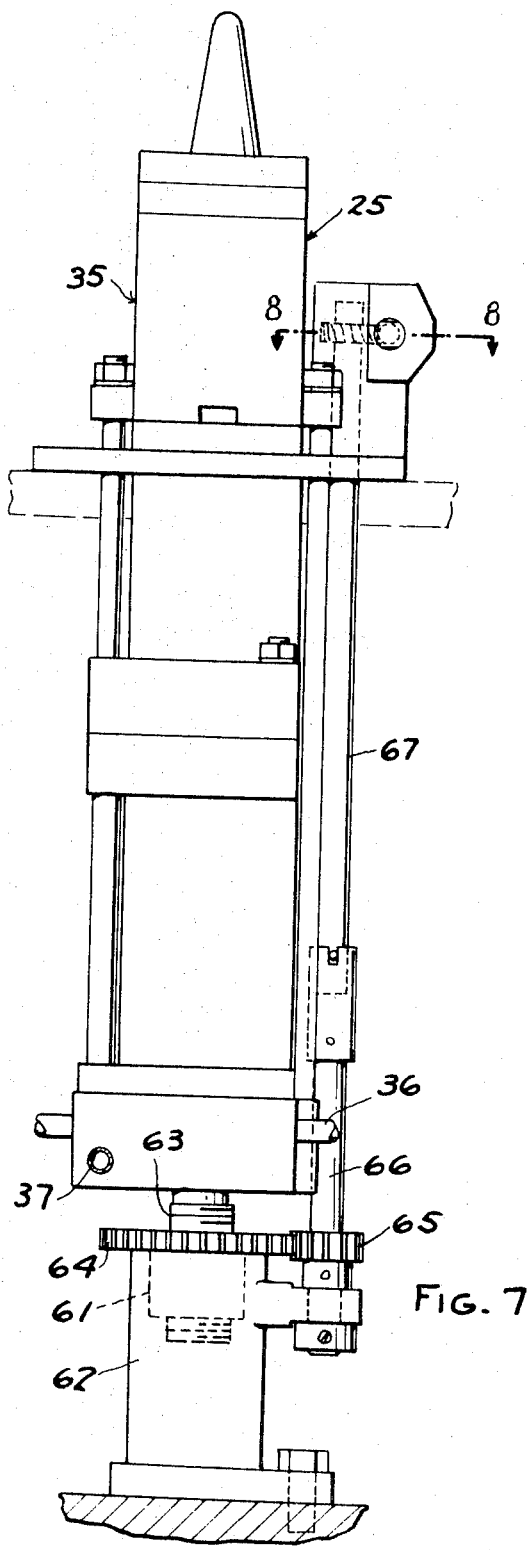
FIG. 7 is fragmentary side elevational view of a portion of the machine shown in FIG. 2.
Figure 8:
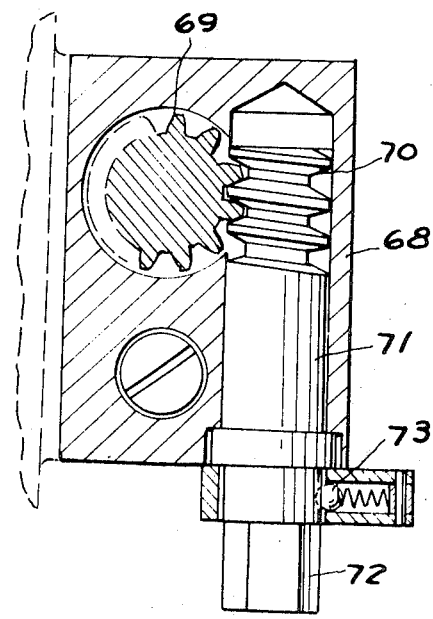
FIG. 8 is a fragmentary sectional view on an enlarged scale taken along the line 8—8 in FIG. 7.

The plunger assembly 25 is vertically adjustably mounted on the machine by the arrangement shown in FIGS. 7 and 8 wherein a nut 61 is rotatably mounted in a support bracket 62 and a screw 63 is fixed to the lower end of the cylinder assembly and threaded into nut 61. A gear 64 is fixed to the nut 61 and meshes with a second gear 65 fixed on a vertical shaft 66 that is rotatably mounted on the support bracket 62. Shaft 66 is interengaged with an aligned shaft 67 rotatably mounted in a bracket 68 in the upper portion of the machine adjacent the receiver block 35. A pinion 69 is fixed on the upper end of the shaft 67 and meshes with a worm 70 on a shaft 71. The shaft 71 extends to the exterior and is formed with a noncircular configuration 72 for engagement with a handle or wrench to permit rotation thereof. A spring loaded detent 73 is provided for holding the shaft 71 in any adjusted position. By rotation of the shaft 72, nut 61 is rotated to translate the screw 63 and in turn the entire plunger mold assembly vertically.

It can thus be seen that there has been provided an arrangement wherein each plunger of the triple plunger mold assembly can be individually operated and controlled; wherein each plunger is guided by at least two longitudinally spaced bearings on the piston shaft to insure proper operation thereof; and wherein the interior of each plunger is cooled with the exhaust of cooling fluid being unrestricted so that any contaminants in cooling air will not affect the operation of the plunger.

I claim:
1. In a glass forming machine wherein a charge of glass is delivered to open ended parison molds at a parison molding station, a plunger is urged upwardly to form the parison at the parison molding station and thereafter the parison is transferred to a blow molding station where it is formed into a glass article, the combination comprising
   a parison plunger assembly,
   said parison plunger assembly comprising at least one vertically extending cylinder,
   a piston in said cylinder,
   a piston shaft fixed to said piston and extending upwardly therefrom,
   longitudinally spaced bearings for guiding said piston shaft,
   a plunger,
   means for mounting said plunger on the upper end of said piston shaft, and
   means for guiding the upper end of said shaft adjacent said plunger against rotation,
   said means for guiding said shaft comprising radially extending projections mounted on said piston, and
   a fixed member on said machine having vertically extending slots into which said radially extending projections extend.
2. The combination set forth in claim 1 wherein said means for mounting said plunger on the upper end of said shaft comprises
   a piston head fixed on the upper end of said shaft, and
   a nut threaded on said piston shaft and engaging said plunger to hold said plunger on said piston head,
   said radially extending projections being on said piston head.
3. The combination set forth in claim 2 including means for cooling the interior of said plunger comprising
   a passage in said piston shaft,
   means for supplying cooling fluid to said passage,
   said passage communicating with the interior of said plunger,
   said plunger having relatively unrestricted exhaust openings at the base thereof,
   said piston head having relatively unrestricted exhaust passages communicating with said exhaust openings,
   whereby cooling fluid may pass substantially freely outwardly from said plunger to the exterior.
4. The combination set forth in claim 3 including a cooling tip fixed on the upper end of said piston shaft and communicating with the passage of said piston shaft,
   said cooling tip having at least one opening therein for directing the cooling fluid against the interior of the hollow plunger.
5. The combination set forth in claim 1 wherein each said plunger is hollow, and
   means for cooling the interior of each said plunger comprising a hollow cooling tip on the upper end of said piston shaft,
   said piston shaft having a longitudinally extending passage therein communicating with the interior of said cooling tip, and
   means for supplying cooling fluid to the interior of said piston shaft,
   said cooling tip having at least one opening therein for directing cooling fluid against the interior of said plunger, and
   exhaust passages at the base of said plunger providing substantially unrestricted passage of the cooling fluid to the exterior.
6. The combination set forth in claim 1 wherein said parison plunger assembly comprises a plurality of said vertically extending cylinders,
   each cylinder having a piston, piston shaft, longitudinally spaced bearings, a plunger, and means for guiding the upper end of each shaft as recited in claim 1, and
   means for holding the cylinders of said assemblies in relatively fixed relationship to one another,
   means for adjusting the plunger mold assembly vertically with respect to the machine comprising
   a nut rotatably mounted on said machine,
   a bolt threaded on the lower end of said plunger assembly and into said nut, and
   means for rotating said nut relative to said bolt.
7. The combination set forth in claim 6 wherein said last-mentioned means comprises
   a gear fixed to said nut,
   a gear rotatably mounted and meshed with said first-mentioned gear, and
   means for rotating said second gear to, in turn, rotate said first gear and said nut thereby displacing said bolt and, in turn, the plunger assembly vertically.
8. The combination set forth in claim 7 wherein said last-mentioned means comprises
   a shaft extending upwardly,
   a pinion fixed to the upper end of said shaft,
   a worm threaded with said pinion, and
   a shaft on which said worm is fixed.

References Cited

UNITED STATES PATENTS

| | | | |
|---|---|---|---|
| 1,977,743 | 10/1934 | Soubier et al. | 65—246X |
| 2,508,890 | 5/1950 | Rowe | 65—229X |
| 2,702,444 | 2/1955 | Rowe | 65—246X |
| 3,241,941 | 3/1966 | Abbott et al. | 65—239X |
| 3,281,228 | 10/1966 | Andersen | 65—362X |
| 3,314,775 | 4/1967 | Shetler et al. | 65—322X |
| 3,434,820 | 3/1969 | Zappia et al. | 65—237X |

FOREIGN PATENTS

| | | | |
|---|---|---|---|
| 190,806 | 6/1906 | Germany | 65—246 |

FRANK W. MIGA, Primary Examiner

U.S. Cl. X.R.

65—229, 236, 237, 346, 362

PO-1050
(5/69)

UNITED STATES PATENT OFFICE
CERTIFICATE OF CORRECTION

Patent No. 3,585,018   Dated   June 15, 1971

Inventor(s)  GEORGE W. IRWIN

It is certified that error appears in the above-identified patent and that said Letters Patent are hereby corrected as shown below:

Column 2, line 13, delete "provided" and insert therefor --inverted--

Signed and sealed this 21st day of September 1971.

(SEAL)
Attest:

EDWARD M. FLETCHER, JR.
Attesting Officer

ROBERT GOTTSCHALK
Acting Commissioner of Patents